(12) United States Patent
Anahid et al.

(10) Patent No.: US 12,485,489 B2
(45) Date of Patent: Dec. 2, 2025

(54) UNCERTAINTY QUANTIFICATION OR PREDICTIVE DEFECT MODEL FOR MULTI-LASER POWDER BED FUSION ADDITIVE MANUFACTURING

(71) Applicant: Raytheon Technologies Corporation, Farmington, CT (US)

(72) Inventors: Masoud Anahid, Galena, OH (US); Matthew E. Lynch, Canton, CT (US); Malcolm P. MacDonald, Bloomfield, CT (US); Ranadip Acharya, Glastonbury, CT (US); Brian A. Fisher, West Hartford, CT (US)

(73) Assignee: RTX Corporation, Farmington, CT (US)

( * ) Notice: Subject to any disclaimer, the term of this patent is extended or adjusted under 35 U.S.C. 154(b) by 383 days.

(21) Appl. No.: 18/201,787

(22) Filed: May 25, 2023

(65) Prior Publication Data

US 2024/0390983 A1 Nov. 28, 2024

(51) Int. Cl.
*B33Y 50/02* (2015.01)
*B22F 10/28* (2021.01)
(Continued)

(52) U.S. Cl.
CPC .............. *B22F 10/85* (2021.01); *B22F 10/28* (2021.01); *B22F 10/37* (2021.01); *B22F 12/58* (2021.01); *B33Y 50/02* (2014.12)

(58) Field of Classification Search
CPC ...................................................... B33Y 50/02
See application file for complete search history.

(56) References Cited

U.S. PATENT DOCUMENTS 10,888,924 B2 1/2021 Burlatsky et al.
11,203,160 B2 12/2021 Vora et al.
(Continued)

FOREIGN PATENT DOCUMENTS

| CN | 113084193 | | 7/2021 | | |
| EP | 3940630 A1 | * | 1/2022 | ............. | G06T 7/001 |
| JP | WO2022097651 A1 | * | 11/2021 | | |

OTHER PUBLICATIONS

Zhang et al, Computational Modeling of the Inert Gas flow behavior on spatter distribution in selective laser melting, 2019, the state university of New Jersey USA, pp. 11 (Year: 2019).*

(Continued)

*Primary Examiner* — Suresh Suryawanshi
(74) *Attorney, Agent, or Firm* — Bachman & LaPointe, P.C.

(57) ABSTRACT

A process for uncertainty quantification for a predictive defect model for multi-laser additive manufacturing of a part including executing computational fluid dynamics modeling of a gas flow in an additive manufacturing machine manufacturing chamber; assigning a spatter particle size, velocity and direction relative to a melt pool on a powder bed disposed on a build plate within the manufacturing chamber; executing computational fluid dynamics post processing for spatter particle tracking; predicting a spatter particle landing pattern; feeding the spatter particle landing pattern prediction into a defect model; producing a layer thickness map, the layer thickness map configured to demonstrate a location of locally thicker layers on the part; and predicting defect location and density to accumulate lack-of-fusion risk as a function of part placement, orientation, and scan strategy.

20 Claims, 8 Drawing Sheets

(51) Int. Cl.
 *B22F 10/37* (2021.01)
 *B22F 10/85* (2021.01)
 *B22F 12/58* (2021.01)

(56) References Cited

U.S. PATENT DOCUMENTS

| | | |
|---|---|---|
| 11,531,920 B2 | 12/2022 | Anahid et al. |
| 11,534,961 B2 | 12/2022 | Gold |
| 11,571,747 B2 | 2/2023 | Nassar et al. |
| 11,577,460 B2 * | 2/2023 | Binek .................... B22F 12/38 |
| 2017/0106593 A1 * | 4/2017 | Khairallah ............. B33Y 10/00 |
| 2020/0180023 A1 * | 6/2020 | Narita .................... B22F 12/90 |
| 2020/0189183 A1 * | 6/2020 | Khairallah ............ B29C 64/393 |
| 2021/0101341 A1 * | 4/2021 | Zhang .................. B22F 10/322 |
| 2021/0107214 A1 * | 4/2021 | Khairallah ............. B29C 64/35 |
| 2023/0294215 A1 * | 9/2023 | Tamura ................. B33Y 40/00 |
| | | 219/121.64 |

OTHER PUBLICATIONS

Lutter-Gunther et al, Spatter formation during laser beam melting of AlSi10Mg and effects on power quality, 2018, Elsevier Ltd, pp. 6 (Year: 2018).*

Ganesh-Ram et al, Study of spatter formation and effect of anti-spatter liquid in laser powder bed fusion processed Ti-6Al-4V samples, 2021, Mechanical & Aerospace Engineering, University of Texas USA, pp. 9 (Year: 2021).*

Extended European Search Report for counterpart EP Application No. 24166050.5 dated Sep. 26, 2024.

P Bidare et al. Fluid and particle dynamics in laser powder bed fusion, Acta Materialia, pp. 107-120, Aug. 9, 2017.

Theo Zinner et al, Spooky Manufacturing: Probabilistic Sabotage Attack in Metal AM using Shielding Gas Flow Control, Proceedings of the 2022 ACM Workshop on Software Supply Chain Offensive Research and Ecosystems Defenses, ACMPUB27, New York, NY, Nov. 11, 2022.

* cited by examiner

UNCERTAINTY QUANTIFICATION OR PREDICTIVE DEFECT MODEL FOR MULTI-LASER POWDER BED FUSION ADDITIVE MANUFACTURING

U.S. GOVERNMENT RIGHTS

This invention was made with Government support under contract number W911NF-19-9-0001 awarded by the United States Army. The government has certain rights in this invention.

BACKGROUND

The present disclosure relates generally to additive manufacturing, and more specifically to a process for predicting flaw formation by taking into account the uncertainty that can be described by local variation in powder bed layer thickness in single and multi-laser additive manufacturing operations.

Additive manufacturing is a process that is utilized to create components by applying sequential material layers, with each layer being applied to the previous material layer. As a result of the iterative, trial and error, construction process, multiple different parameters affect whether an end product created using the additive manufacturing process includes flaws or is within acceptable tolerances of a given part. Typically, components created using an additive manufacturing process are designed iteratively, by adjusting one or more parameters each iteration and examining the results to determine if the results have the required quality.

Multi-laser additive manufacturing (AM) technology is a promising process to increase allowable part size and rate of production. However, multiple lasers in additive systems could add further complications and challenges to material quality. There is no known tool to predict defect formation and dependency to process parameters for multi-laser applications. It is known how to predict defect type, density and location at the part level under a single laser operation. An example can be the teaching in U.S. Pat. No. 10,252,512 which is incorporated by reference herein.

What is not well known is prediction of the effect of spatter, which can deposit large (>60 µm) particles on the powder bed. These spatter particles locally increase the thickness of the powder bed and may induce lack of fusion defects due to partial melting when irradiated by the laser. Multi-laser additive manufacturing, owing to multiple lasers producing spatter at a given time as well as large build plates that are more likely have spatter land on them, is particularly susceptible to spatter. As the number of lasers acting simultaneously increases, the likelihood of multi-laser interaction goes up.

What is needed is a process for accounting for uncertainty that can be described by local variation in powder bed layer thickness influencing types of defects in components produced by multi-laser powder bed fusion additive manufacturing (PBFAM).

SUMMARY

In accordance with the present disclosure, there is provided a system comprising a computer readable storage device readable by the system, tangibly embodying a program having a set of instructions executable by the system to perform the following steps for predicting defects in powder bed fusion additive manufacturing process for a part, the set of instructions comprising: an instruction to execute computational fluid dynamics modeling of a gas flow in an additive manufacturing machine manufacturing chamber; an instruction to assign a spatter particle size, velocity and direction relative to a melt pool on a powder bed disposed on a build plate within the manufacturing chamber; an instruction to execute computational fluid dynamics post processing for spatter particle tracking; an instruction to predict a spatter particle landing pattern; an instruction to feed the spatter particle landing pattern prediction into a defect model; an instruction to produce a layer thickness map, the layer thickness map configured to demonstrate a location of locally thicker layers on the part; and an instruction to predict defect location and density to accumulate lack-of-fusion risk as a function of part placement, orientation, and scan strategy.

A further embodiment of any of the foregoing embodiments may additionally and/or alternatively include the computational fluid dynamics modeling of the gas flow predicts a flow field inside the chamber.

A further embodiment of any of the foregoing embodiments may additionally and/or alternatively include the spatter particle includes a vector having velocity and direction influenced by the gas flow and laser/melt pool/powder bed dynamics.

A further embodiment of any of the foregoing embodiments may additionally and/or alternatively include the tracking of the spatter particle includes tracking the spatter particle within the chamber as the spatter particle travels into an un-melted powder of the particle bed.

A further embodiment of any of the foregoing embodiments may additionally and/or alternatively include the gas flow influences the spatter particle and a plume formed within the chamber, wherein the gas flow entrains the spatter particle and influences a trajectory of the spatter particle.

A further embodiment of any of the foregoing embodiments may additionally and/or alternatively include an accumulation of spatter particles are formed into a representative spatter particle landing pattern.

A further embodiment of any of the foregoing embodiments may additionally and/or alternatively include the system for additive manufacturing further comprising an instruction to integrate spatter risk by controlling at least one laser to move the melt pool/spatter pattern to a location that reduces formation of defects.

A further embodiment of any of the foregoing embodiments may additionally and/or alternatively include the system for additive manufacturing further comprising an instruction to include a representation of spatter accumulation by local thickness variation in the defect model.

A further embodiment of any of the foregoing embodiments may additionally and/or alternatively include the system for additive manufacturing further comprising an instruction to provide local variation zones to the defect model through boundary polygons for each layer.

A further embodiment of any of the foregoing embodiments may additionally and/or alternatively include the system for additive manufacturing further comprising an instruction to include a nominal additive manufacturing build parameter as an input to the defect model.

A further embodiment of any of the foregoing embodiments may additionally and/or alternatively include a local increase of layer thickness is responsive to a lack of fusion in the powder bed.

A further embodiment of any of the foregoing embodiments may additionally and/or alternatively include the local increase of layer thickness is responsive to at least one of a spatter particle landing on the powder bed and a damaged recoater blade.

A further embodiment of any of the foregoing embodiments may additionally and/or alternatively include the spatter particle landing pattern is configured representative of various scan angle directions relative to the gas flow, wherein the scan angle is selected from the group consisting of 0 degrees, −15 degrees, −30 degrees, −45 degrees, and −60 degrees.

In accordance with the present disclosure, there is provided a process for uncertainty quantification for a predictive defect model for multi-laser additive manufacturing of a part comprising executing computational fluid dynamics modeling of a gas flow in an additive manufacturing machine manufacturing chamber; assigning a spatter particle size, velocity and direction relative to a melt pool on a powder bed disposed on a build plate within the manufacturing chamber; executing computational fluid dynamics post processing for spatter particle tracking; predicting a spatter particle landing pattern; feeding the spatter particle landing pattern prediction into a defect model; producing a layer thickness map, the layer thickness map configured to demonstrate a location of locally thicker layers on the part; and predicting defect location and density to accumulate lack-of-fusion risk as a function of part placement, orientation, and scan strategy.

A further embodiment of any of the foregoing embodiments may additionally and/or alternatively include the process further comprising integrating a spatter risk by controlling at least one laser to move the melt pool/spatter pattern to a location that reduces formation of defects.

A further embodiment of any of the foregoing embodiments may additionally and/or alternatively include the process further comprising including a representation of spatter accumulation by local thickness variation in the defect model.

A further embodiment of any of the foregoing embodiments may additionally and/or alternatively include the process further comprising providing local variation zones into the defect model through boundary polygons for each layer.

A further embodiment of any of the foregoing embodiments may additionally and/or alternatively include the process further comprising including a nominal additive manufacturing build parameter as an input to the defect model.

A further embodiment of any of the foregoing embodiments may additionally and/or alternatively include the gas flow influences the spatter particle and a plume formed within the chamber, wherein the gas flow entrains the spatter particle and influence a trajectory of the spatter particle.

A further embodiment of any of the foregoing embodiments may additionally and/or alternatively include a local increase of layer thickness is responsive to a lack of fusion in the powder bed; wherein the local increase of layer thickness is responsive to at least one of a spatter particle landing on the powder bed and a damaged recoater blade.

Other details of the process are set forth in the following detailed description and the accompanying drawings wherein like reference numerals depict like elements.

DETAILED DESCRIPTION

Figure 1:
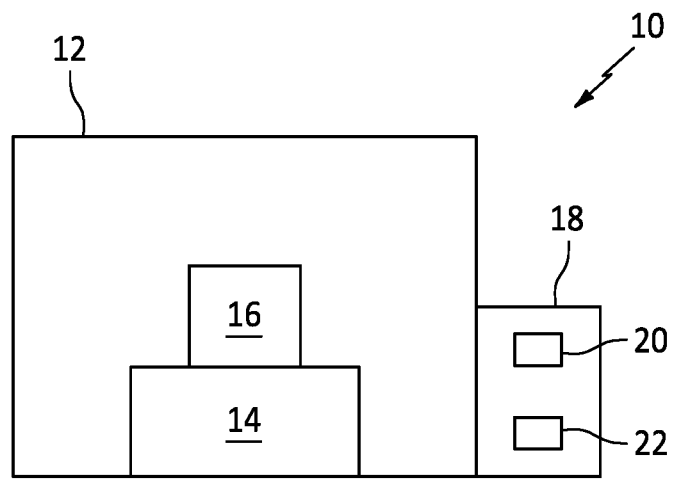
FIG. 1 is a schematic representation of an exemplary additive manufacturing machine.

Referring now to FIG. 1, schematically illustrates an additive manufacturing machine 10, such as a laser powder bed fusion additive manufacturing (PBFAM) machine. In alternate examples, the powder bed fusion machine can be an electron beam powder bed fusion machine. The exemplary additive manufacturing machine 10 includes a manufacturing chamber 12 with a platform 14 upon which a part 16 (alternatively referred to as a work piece) is additively manufactured. A controller 18 is connected to the chamber 12 and controls the additive manufacturing process according to any known additive manufacturing control system.

Included within the controller 18 is a processor 20 that receives and interprets input operations to define a sequence of the additive manufacturing. As utilized herein "operations" refers to instructions specifying operational conditions for one or more step in an additive manufacturing process. The controller 18 can, in some examples, include user interface devices such as a keyboard and view screen. In alternative examples, the controller 18 can include a wireless or wired communication apparatus for communicating with a remote user input device such as a PC.

Also included in the controller 18 is a memory 22. In some examples, the controller 18 receives a desired additive manufacturing operation, or sequence of operations, and evaluates the entered operation(s) to determine if the resultant part 16 will be free of flaws. For the purposes of the instant disclosure, free of flaws, or flaw free, refers to a part 16 or workpiece with no flaws causing the part or workpiece to fall outside of predefined flaw tolerance. By way of example, the predefined tolerances can include an amount of unmelt, a surface roughness, or any other measurable property of the part 16. By way of example, factors impacting the output parameters can include material properties, environmental conditions, laser power, laser speed, or any other factors. While described and illustrated herein as a component of a laser powder bed fusion additive manufacturing machine, the software configuration and operations can, in some examples, be embodied as a distinct software program independent of the additive manufacturing machine, or included within any other type of additive manufacturing machine.

A build strategy is parsed and/or specifically prescribed scan vectors are used to create stripe and hatch definitions in each layer of the build. The additive build is simulated layer-by-layer. The output is a map in build parameter space (e.g. laser power, laser speed, layer thickness, etc.). The map is partitioned into different regions reflecting whether flaws are present: lack of fusion, keyholing, the flaw-free "good" zone, etc. A process map is optionally location-specific and dependent upon geometry. If the entirety of a part is in the "good" zone of the process map, it is predicted to be flaw-free.

By using the defined process map, a technician can generate a part 16, or design a sequence of operations to generate a part 16, without requiring substantial empirical prototyping to be performed. This, in turn, allows the part to be designed faster, and with less expense, due to the substantially reduced number of physical iterations performed.

Figure 2:
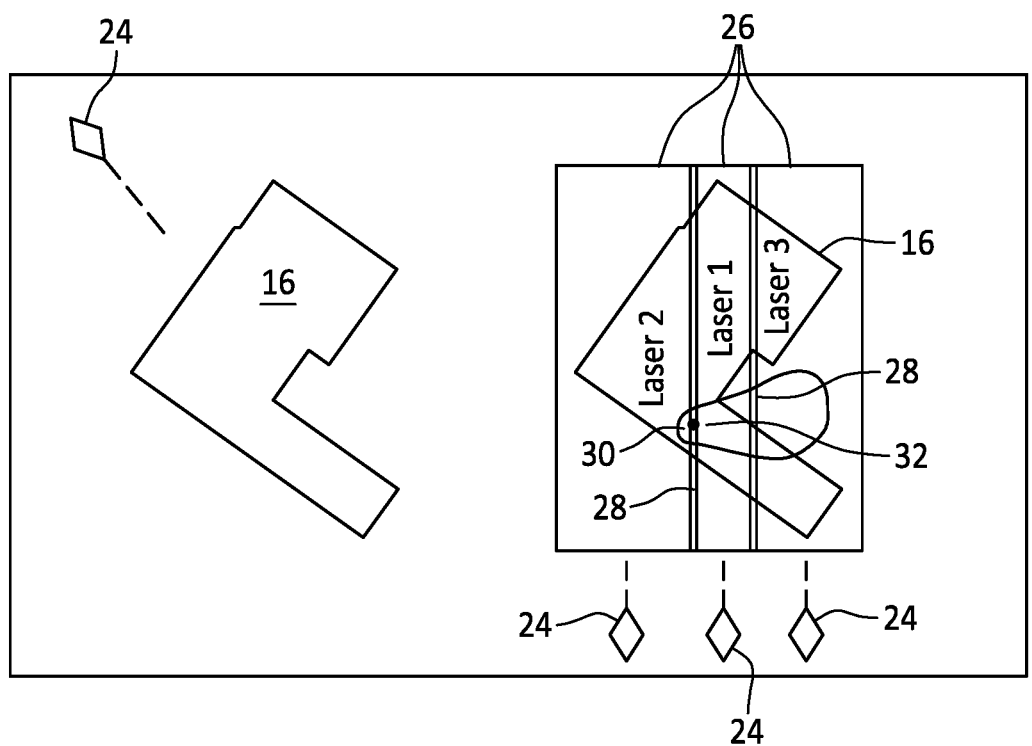
FIG. 2 is a schematic representation of a part created by a single laser along side the part created by multiple lasers.

Referring also to FIG. 2, the part 16 is shown as being created by a single laser and multiple lasers. The part 16 shown on the left side of FIG. 2 is laid down by use of a single laser 24. The whole part 16 is assigned to the single laser 24. The part 16 shown to the right side of FIG. 2 is assigned to multiple lasers 24. The multi-laser fusion is configured to increase the rate at which the part 16 can be built. The single laser fusion can have a different set of heat flux, interlayer dwell time, underlying temperature than the multi-laser fusion configuration.

With multi-laser fusion processes the part 16 can be divided into multiple regions 26, such as laser 1 region, laser 2 region and laser 3 region, as shown. Each region 26 can be processed by the different lasers 24. So, each region may have a different set of heat flux, underlying temperature, and the like.

In FIG. 2, the multi-laser arrangement can include laser interface 28 along the common boundaries of the regions 26. It is possible to create a laser interaction zone 30 near these interfaces 28. The lasers 24 can create conditions that cause interaction between the adjoining lasers 24. (Spatter/plume) laser interaction zone 30 is not constrained to the region 26 boundaries.

Figure 3:
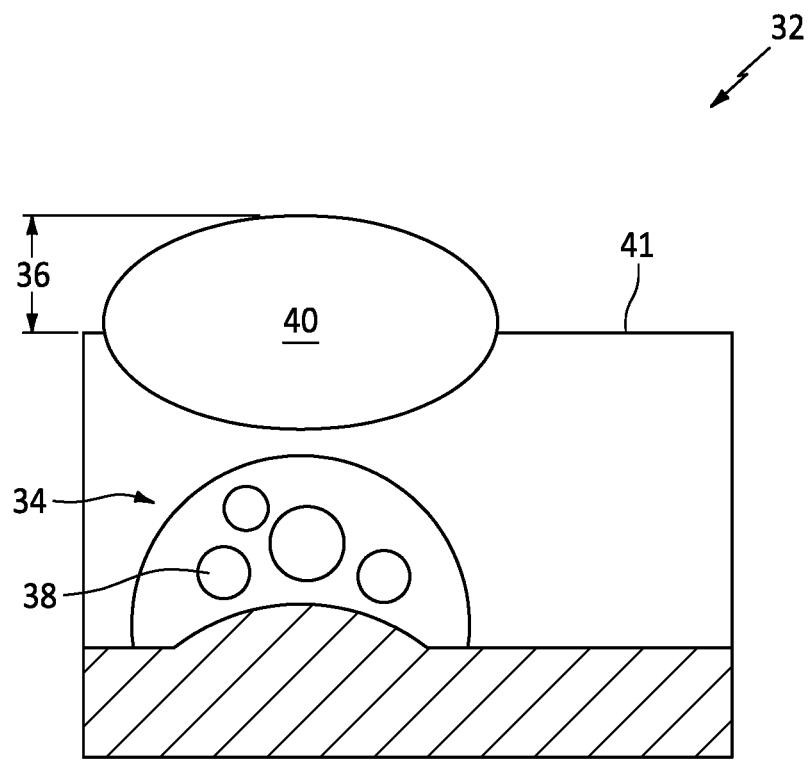
FIG. 3 is a schematic representation of spatter incorporation.

Referring also to FIG. 3, showing spatter incorporation 32. Spatter generation is due to laser activity. A single laser can also cause spatter. The laser interaction zone 30 is caused by the two lasers operating simultaneously and contemporaneously adjacent along the laser interface 28. Each laser 24 can create spatter that interacts with the other laser 24. The laser spatter interaction can result in increased occurrence of lack of fusion defects 34, and a layer thickness disparity 36, as seen in FIG. 3. The laser interaction zone 30 can include conditions that negatively impact one or more of the contemporaneous lasers 24 that results in deviation from normal laser application, intensity, location and the like. Spatter or other unwanted particle contamination can influence the quality of the build.

A particle or powder 38 can be shielded by spatter and fail to melt. The un-melted powder 38 can cause layer disparity 36. Also partially melted spatter particles 40 can stand proud of the weld track surface 41 and create the layer disparity 36, shown as a local increase in layer thickness.

Figure 4:
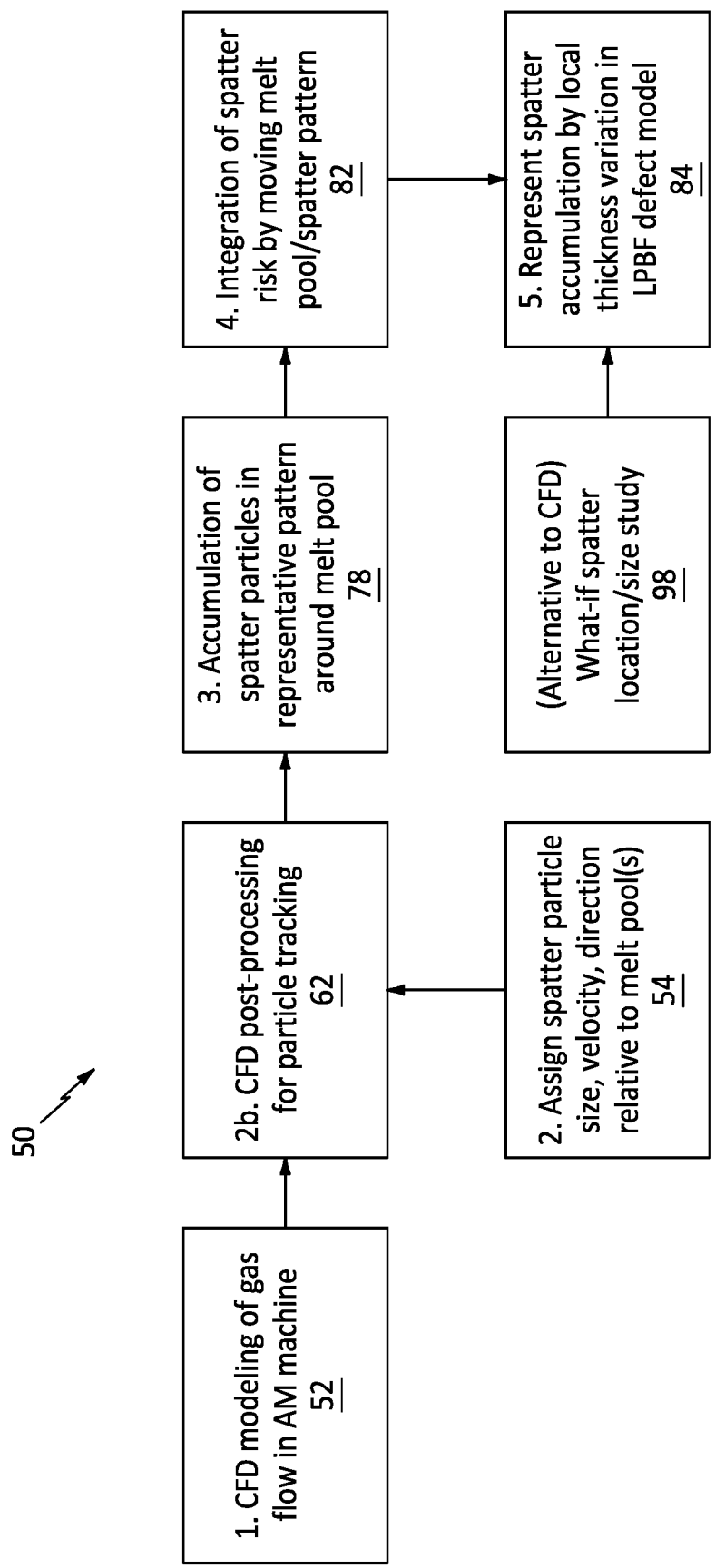
FIG. 4 is a schematic representation of a process diagram.
Figure 5:
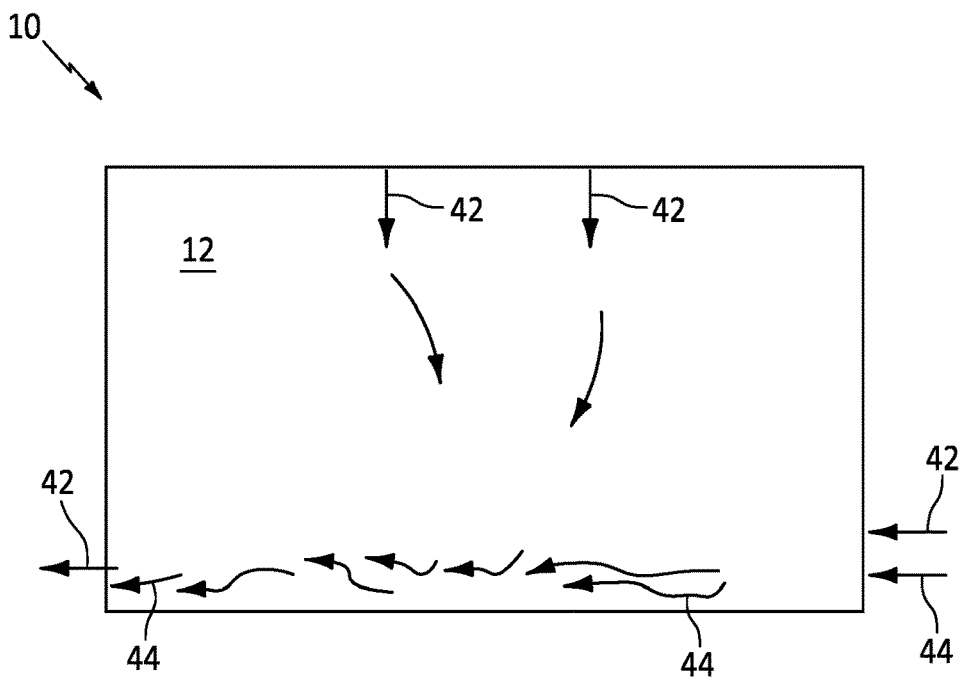
FIG. 5 is a schematic representation of gas flow in the manufacturing chamber.

Referring also to FIG. 4, a multi-step process to predict effect of spatter on LPBF defects is shown. The process 50 can include a step 52 which includes computational fluid dynamics (CFD) modeling of a gas flow 42 (argon and the like) in the additive manufacturing machine 10 manufacturing chamber 12. FIG. 5 shows an exemplary additive manufacturing machine 10 manufacturing chamber 12. The gas flow 42 shown as flow arrows 44. The computational fluid dynamics (CFD) modeling of the gas flow 42 in the manufacturing chamber 12 can result in a prediction of the flow field inside the chamber 12 as depicted. The prediction of the gas flow 42 direction as shown by arrows 44 in the chamber 12 provides a basis for the estimation of spatter flight 46 as described in more detail below.

Figure 6:
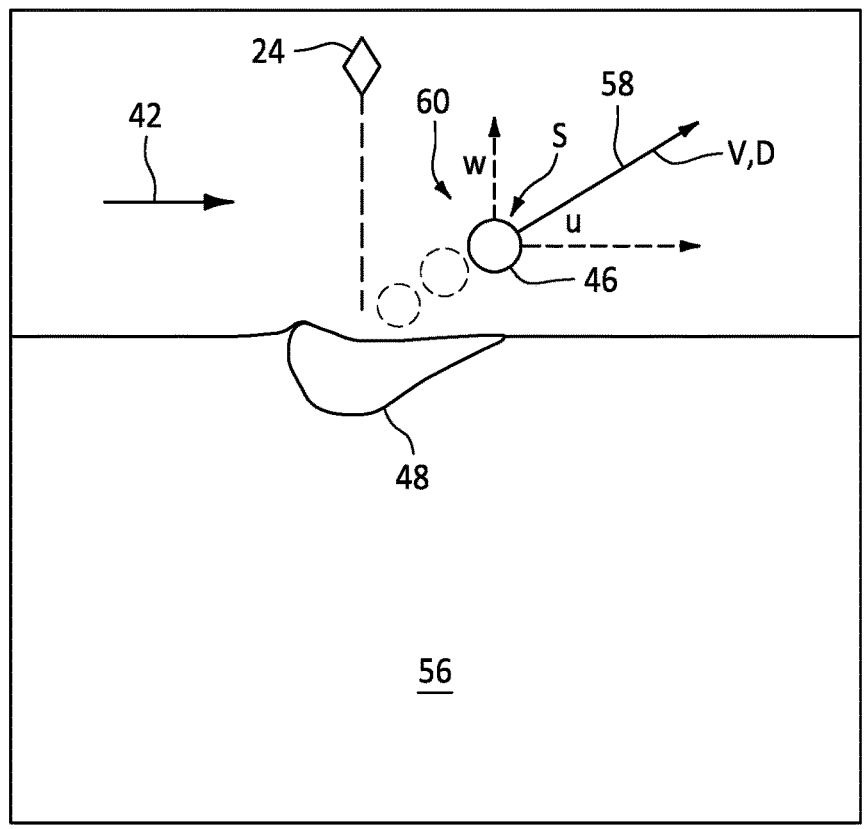
FIG. 6 is a schematic diagram of a spatter particle relative to a melt pool.

The next step 54 includes assigning spatter particle 46 size S, velocity V and direction D relative to a melt pool 48, shown in FIG. 6. The melt pool 48 is shown on solidified material 56. The particle 46 can include a vector 58 having velocity V and direction D as influenced by the gas flow 42 and laser/melt pool/powder bed dynamics. The particle 46 can be seen as ejected from the powder bed and being carried in the gas flow 42 as spatter particle 60.

Figure 7:
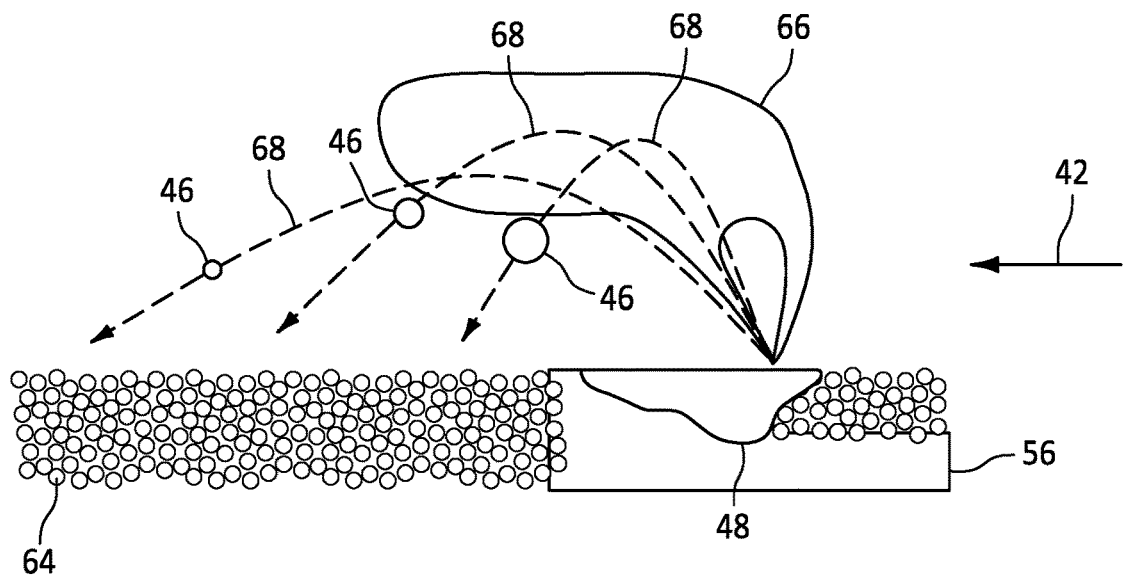
FIG. 7 is a schematic diagram of a spatter particle influenced by gas flow.
Figure 8:
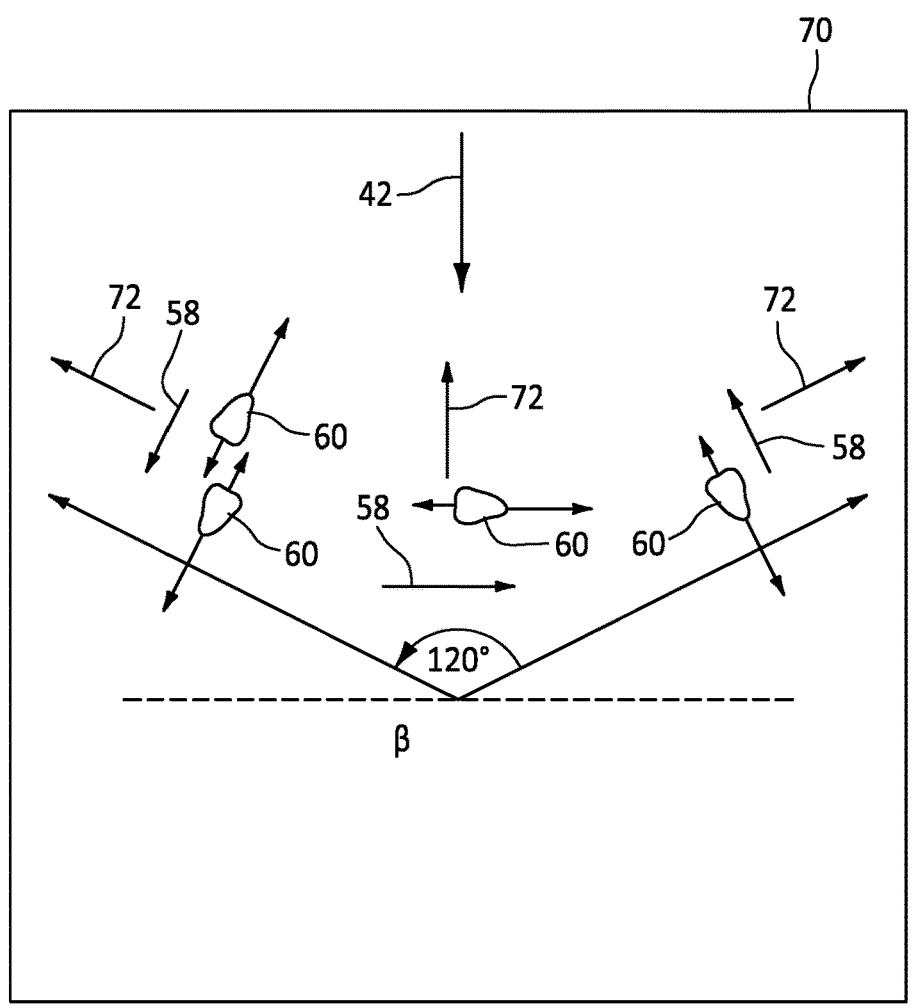
FIG. 8 is a schematic representation of spatter particles in post-processing for particle tracking.
Figure 9:
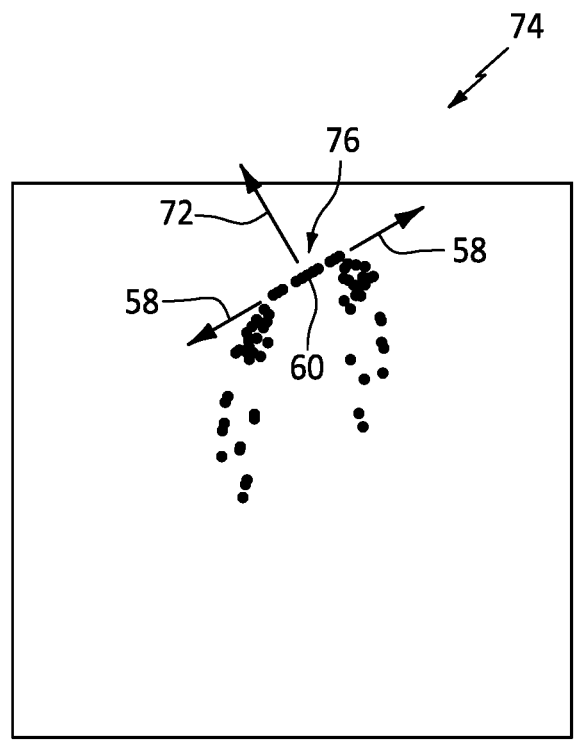
FIG. 9 is a schematic representation of a spatter particle landing site prediction diagram.

The next step 62 includes computational fluid dynamics (CFD) post processing for particle tracking, as also shown in FIG. 7, FIG. 8, and FIG. 9. The post-processing for particle tracking can help to track the spatter particle(s) 46 as it travels into the un-melted powder particle bed 64. The spatter particle 46 can have various diameter sizes S. A plume 66 is shown formed proximate the melt pool 48 a result of the laser activity. The plume 66 can include vaporized composition of laser interaction byproducts. The spatter particle 46 and plume 66 are shown being influenced by the gas flow 42, as determined in step 52. The spatter particle 46 will have an initial velocity V, as determined in step 54. The gas flow 42 can entrain the spatter particle 46 and influence the trajectory 68.

FIG. 8 shows a plan view of spatter particles 60 flowing over a build plate 70. The spatter particles 60 have a vector direction 58. The stripe direction 72 is indicated. The spatter particles of varying diameter S, are assigned a velocity V and direction 68.

FIG. 9 shows a spatter particle 60 landing site prediction diagram 74. The diagram 74 illustrates the pattern of landing sites for spatter particle 60. The stripe direction 72 and vectors 58 are shown relative to a spatter particle 60 landing site 76. The diagram 74 is relative to a −30 degree scan angle relative to gas flow 42. The Fluent or CFX particle tracking can be based on computational fluid dynamics gas flow inside the chamber 12. The spatter prediction can be fed into a defect model and used to accumulate lack-of-fusion risk as a function of part placement, orientation, and scan strategy. The laser 24 heats the metal so quickly that some of the material is boiled. This boiled metal is the plume and generates a driving pressure to eject spatter 60. The initial conditions of the spatter 60 travel is dictated by the conditions of the melting and boiling. The trajectory of the spatter depends on these initial conditions and the gas flow 42.

Figure 10:
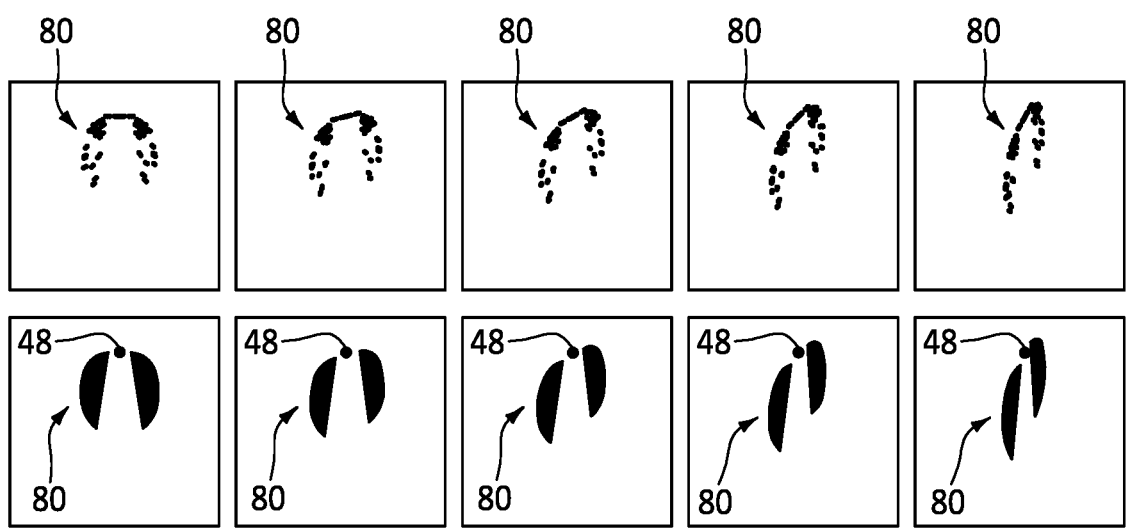
FIG. 10 is a schematic representation of representative patterns taken from various scan angles.

The process 50 can include the next step 78, which entails the accumulation of spatter particles 60 in a representative pattern 80. Representative patterns 80 are shown taken from various scan angles in FIG. 10. There can be various scan angle directions relative to the gas flow 42, such as 0 degrees, −15 degrees, −30 degrees, −45 degrees, and −60 degrees. The representative patterns 80 around the melt pool 48 can be "lobes" of spatter accumulation location and size predicted for the varied scan directions.

Figure 11:
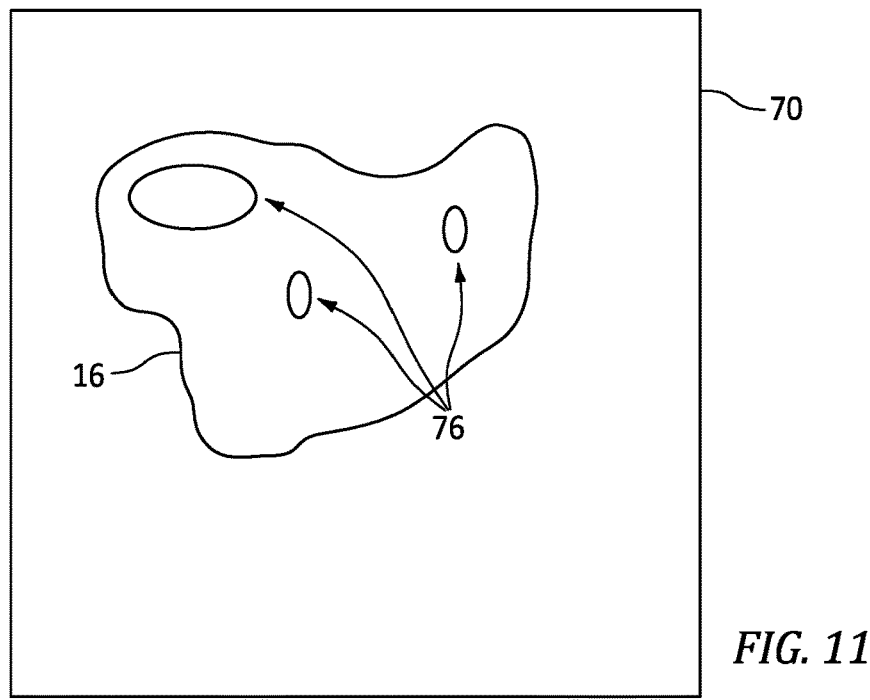
FIG. 11 is a schematic representation of the additive manufacturing build plate with predicted spatter particle landing sites on the part.
Figure 12:
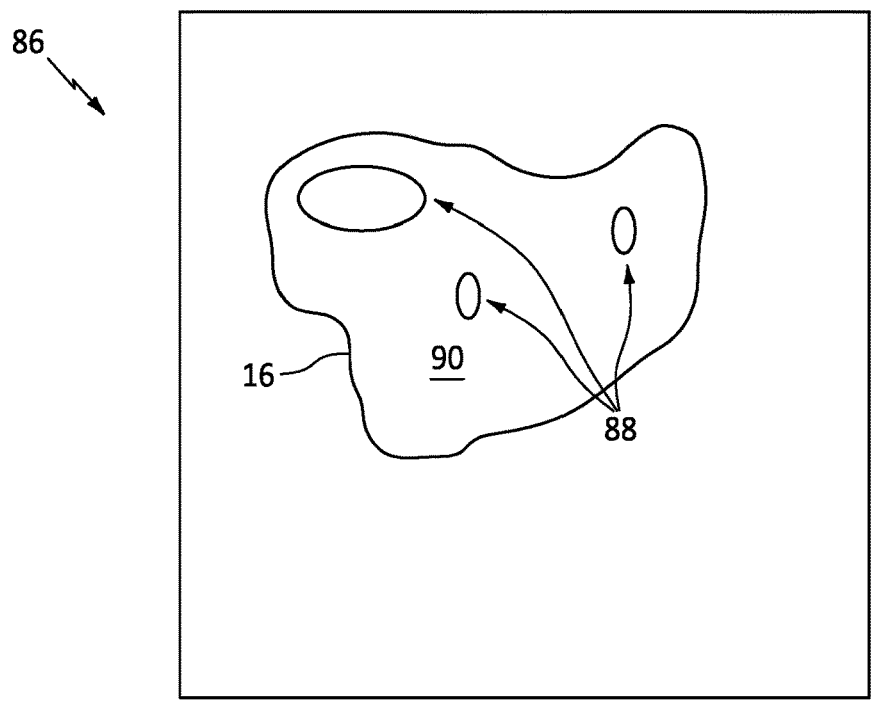
FIG. 12 is a schematic representation of a layer thickness map.
Figure 13:
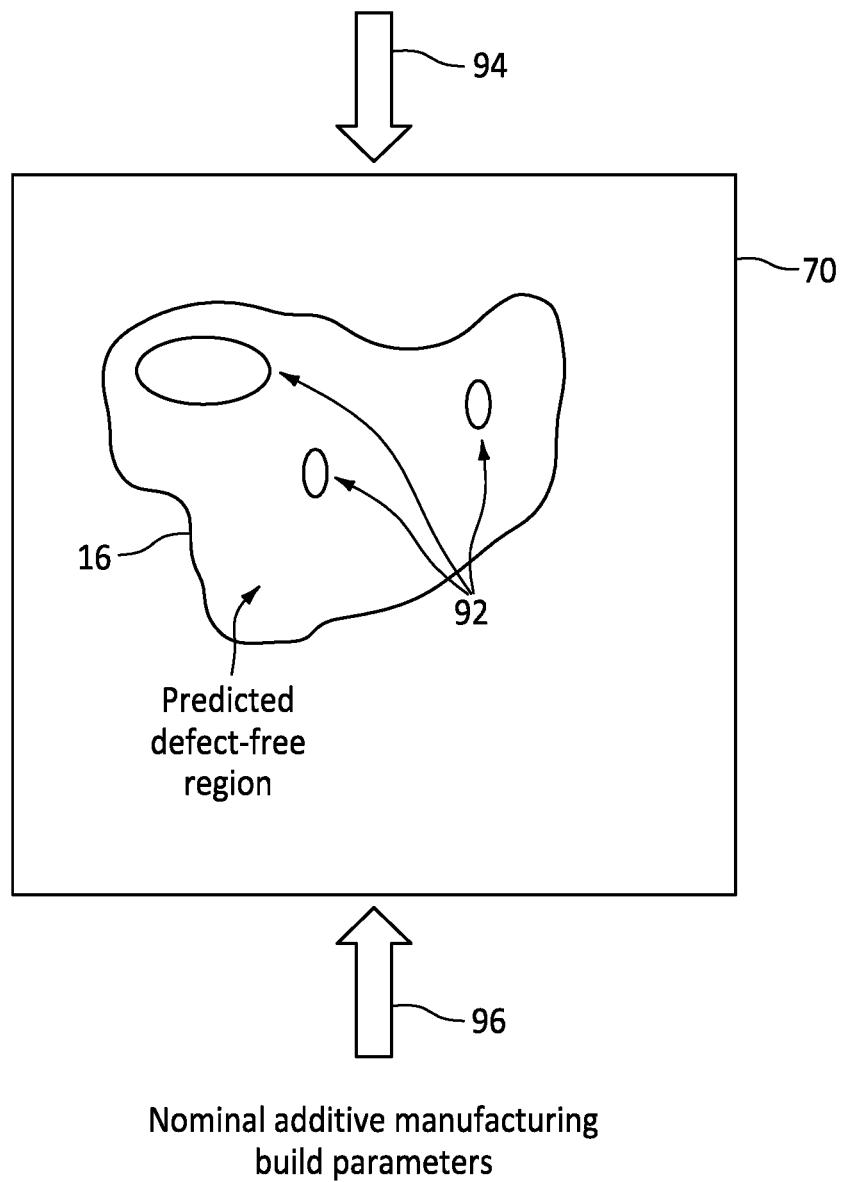
FIG. 13 is a schematic representation of predicted defect location and density map.

The process 50 can include step 82 integration of spatter risk by moving the melt pool/spatter pattern. FIG. 11 shows the additive manufacturing build plate 70 with predicted spatter particle 60 landing sites 76 on the part 16. The spatter particle 60 can have a diameter w=w(x,y). Spatter risk can be used to determine the optimal locations for parts 16 that reduces the risk of defect formation. FIG. 11 would be generated based on an input build layout, then converted into FIG. 12 to assess the risk of spatter 60 landing to create defects (by using the defect model with locally varied powder thickness), resulting in FIG. 13. FIG. 13 could be used as input to modify the locations of parts or critical regions within a part relative to each other to mitigate any spatter risk. In this embodiment, this would be an iterative process to optimize the resultant build layout.

Step 84 can include the representation of spatter accumulation by local thickness variation in a defect model. The FIG. 12 shows a layer thickness map 86. The layer thickness map 86 demonstrates the location of locally thicker layers 88 with the thickness $t=t(x,y)$. The remainder of the locations on the part can have a nominal layer thickness 90.

FIG. 13 shows the predicted defect location and density. Step 84 includes a prediction of defect location and defect density $d=d(x,y)$. The predicted lack-of-fusion defect regions 92 are shown. The local layer thickness 94 is an input. Another input can include a nominal additive manufacturing build parameter 96. Local increase of layer thickness 94 can result in a lack of fusion in the powder bed. The layer thickness 94 can locally increase for different reasons, such as, landing spatters and damaged recoater blade. The focus of the disclosure is to evaluate the effect of layer thickness variation on defect formation. Two sources of thickness variation are landing spatters and recoater error. Local variation zones are inputs to the defect model through boundary polygons for each layer. Landing spatters is one way to get local thickness variation, though the framework can also accept other boundary polygons for other layer thickness variation if available.

An alternative to computational fluid dynamics can include a What-if spatter location and size study as shown in FIG. 4 at step 98. In this case the user evaluates the risk of defect formation by assuming different thickness variation scenarios.

A technical advantage of the disclosed process can include the prediction of local variation of layer thickness, which can detect the lack of fusion or keyholing.

Another technical advantage of the disclosed process can include prediction of the lack of fusion from spatter from the same layer or prior layers in the build landing on the powder bed.

Another technical advantage of the process can include prediction of the lack of fusion or keyholing from recoater error.

Another technical advantage of the process can include applications to both single-laser and multi-laser powder bed fusion additive manufacturing.

Another technical advantage of the process can include providing a higher quality single-laser and multi-laser powder bed fusion additive manufacturing.

Another technical advantage of the process can include optimized laser path planning to maximize laser on-time while minimizing laser interaction and therefore defect production. This results in faster powder bed fusion additive manufacturing processing.

Another technical advantage of the process can include helping engineers and designers understand and develop multi-laser powder bed fusion additive manufacturing processes to increase rate of production and build large size parts.

Another technical advantage of the process can include minimizing the costly and time consuming trial and error practices which are currently used for qualifying additive manufacturing parts.

Another technical advantage of the process can include information obtained from this predictive model can be utilized to additively manufacture high quality parts which in turn minimizes post-build operations in the production process chain.

Anther technical advantage of the process can include a means to optimize the placement and/or orientation of parts within the build volume to minimize defects in multi-laser systems.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system comprising a computer readable storage device readable by the system, tangibly embodying a program having a set of instructions executable by the system to perform the following steps for predicting defects in powder bed fusion additive manufacturing process for a part, the set of instructions comprising:
   an instruction to execute computational fluid dynamics modeling of a gas flow in an additive manufacturing machine manufacturing chamber;
   an instruction to assign a spatter particle size, velocity and direction relative to a melt pool on a powder bed disposed on a build plate within the manufacturing chamber;
   an instruction to execute computational fluid dynamics post processing for spatter particle tracking;
   an instruction to predict a spatter particle landing pattern;
   an instruction to feed the spatter particle landing pattern prediction into a defect model;
   an instruction to produce a layer thickness map, the layer thickness map configured to demonstrate a location of locally thicker layers on the part; and
   an instruction to predict defect location and density to accumulate lack-of-fusion risk as a function of part placement, orientation, and scan strategy.

2. The system for additive manufacturing according to claim 1, wherein the computational fluid dynamics modeling of the gas flow predicts a flow field inside the chamber.

3. The system for additive manufacturing according to claim 1, wherein the spatter particle includes a vector having velocity and direction influenced by the gas flow and laser/melt pool/powder bed dynamics.

4. The system for additive manufacturing according to claim 1, wherein the tracking of the spatter particle includes tracking the spatter particle within the chamber as the spatter particle travels into an un-melted powder of the particle bed.

5. The system for additive manufacturing according to claim 1, wherein the gas flow influences the spatter particle and a plume formed within the chamber, wherein the gas flow entrains the spatter particle and influences a trajectory of the spatter particle.

6. The system for additive manufacturing according to claim 1, wherein an accumulation of spatter particles are formed into a representative spatter particle landing pattern.

7. The system for additive manufacturing according to claim 1, further comprising:
   an instruction to integrate spatter risk by controlling at least one laser to move the melt pool/spatter pattern to a location that reduces formation of defects.

8. The system for additive manufacturing according to claim 1, further comprising:
an instruction to include a representation of spatter accumulation by local thickness variation in the defect model.

9. The system for additive manufacturing according to claim 1, further comprising:
an instruction to provide local variation zones to the defect model through boundary polygons for each layer.

10. The system for additive manufacturing according to claim 1, further comprising:
an instruction to include a nominal additive manufacturing build parameter as an input to the defect model.

11. The system for additive manufacturing according to claim 1, wherein a local increase of layer thickness is responsive to a lack of fusion in the powder bed.

12. The system for additive manufacturing according to claim 11, wherein the local increase of layer thickness is responsive to at least one of a spatter particle landing on the powder bed and a damaged recoater blade.

13. The system for additive manufacturing according to claim 1, wherein the spatter particle landing pattern is configured representative of various scan angle directions relative to the gas flow, wherein the scan angle is selected from the group consisting of 0 degrees, −15 degrees, −30 degrees, −45 degrees, and −60 degrees.

14. A process for uncertainty quantification for a predictive defect model for multi-laser additive manufacturing of a part comprising:
executing computational fluid dynamics modeling of a gas flow in an additive manufacturing machine manufacturing chamber;
assigning a spatter particle size, velocity and direction relative to a melt pool on a powder bed disposed on a build plate within the manufacturing chamber;
executing computational fluid dynamics post processing for spatter particle tracking;
predicting a spatter particle landing pattern;
feeding the spatter particle landing pattern prediction into a defect model;
producing a layer thickness map, the layer thickness map configured to demonstrate a location of locally thicker layers on the part; and
predicting defect location and density to accumulate lack-of-fusion risk as a function of part placement, orientation, and scan strategy.

15. The process of claim 14, further comprising:
integrating a spatter risk by controlling at least one laser to move the melt pool/spatter pattern to a location that reduces formation of defects.

16. The process of claim 14, further comprising:
including a representation of spatter accumulation by local thickness variation in the defect model.

17. The process of claim 14, further comprising:
providing local variation zones into the defect model through boundary polygons for each layer.

18. The process of claim 14, further comprising:
including a nominal additive manufacturing build parameter as an input to the defect model.

19. The process of claim 14, wherein the gas flow influences the spatter particle and a plume formed within the chamber, wherein the gas flow entrains the spatter particle and influence a trajectory of the spatter particle.

20. The process of claim 14, wherein a local increase of layer thickness is responsive to a lack of fusion in the powder bed; wherein the local increase of layer thickness is responsive to at least one of a spatter particle landing on the powder bed and a damaged recoater blade.

* * * * *